US012551907B2

(12) United States Patent
Drake

(10) Patent No.: US 12,551,907 B2
(45) Date of Patent: Feb. 17, 2026

(54) PENDENT VERTICAL SIDEWALL WINDOW SPRINKLERS, SYSTEMS AND METHODS OF FIRE PROTECTION

(71) Applicant: Minimax Viking Patent Management GmbH, Bad Oldesloe (DE)

(72) Inventor: Jonathan D. Drake, Potsdam, NY (US)

(73) Assignee: Minimax Viking Patent Management GmbH, Bad Oldesloe (DE)

( * ) Notice: Subject to any disclaimer, the term of this patent is extended or adjusted under 35 U.S.C. 154(b) by 383 days.

(21) Appl. No.: 17/737,772

(22) Filed: May 5, 2022

(65) Prior Publication Data

US 2022/0371030 A1 Nov. 24, 2022

Related U.S. Application Data

(63) Continuation of application No. 16/757,881, filed as application No. PCT/US2019/066361 on Dec. 13, 2019, now Pat. No. 11,364,512.

(60) Provisional application No. 62/781,285, filed on Dec. 18, 2018.

(51) Int. Cl.
*A62C 35/68* (2006.01)
*B05B 1/26* (2006.01)

(52) U.S. Cl.
CPC .............. *B05B 1/267* (2013.01); *A62C 35/68* (2013.01)

(58) Field of Classification Search
CPC ........... B05B 1/04; B05B 1/042; B05B 1/046; B05B 17/085; B05B 1/265; B05B 1/267; A62C 35/68
See application file for complete search history.

(56) References Cited

U.S. PATENT DOCUMENTS 1,439,177 A 12/1922 Loepsinger
3,221,995 A * 12/1965 Sievert .................. A62C 37/20 239/524
3,880,239 A 4/1975 Vorkapich
5,669,449 A 9/1997 Polan et al.
5,722,599 A * 3/1998 Fries ...................... A62C 31/02 169/37
6,374,920 B1 4/2002 Hudson et al.
2005/0067171 A1 3/2005 Green
2005/0284645 A1 12/2005 Golinveaux
(Continued)

FOREIGN PATENT DOCUMENTS

GB 2538995 A 12/2016
WO WO2009/014427 1/2009
WO WO 2017/156439 9/2017

OTHER PUBLICATIONS

International Searching Authority, International Search Report and Written Opinion in International Appln. No. PCT/US2019/066361, Apr. 1, 2020, 11 pages.
(Continued)

*Primary Examiner* — Tuongminh N Pham
(74) *Attorney, Agent, or Firm* — Perkins Coie LLP

(57) ABSTRACT

Pendent vertical sidewall fire protection sprinklers, systems and methods for the protection of windows are provided. The sprinklers include a fluid deflection member with an impact surface and an adjacent retention surface having one or more arcuate surface profiles to define a fluid throw channel. The sprinklers and their system installation provide for a maximum sprinkler-to-sprinkler spacing that ranges from over eight feet to fifteen feet (8+ ft. to 15 ft.).

29 Claims, 8 Drawing Sheets

(56) References Cited

U.S. PATENT DOCUMENTS

| | | | |
|---|---|---|---|
| 2015/0246252 | A1 | 9/2015 | Ancone et al. |
| 2021/0260422 | A1 | 8/2021 | Drake |

OTHER PUBLICATIONS

Globe Sprinkler Company, Datasheet, Window Sprinkler Model WS, Series GL-SS/WS, GFS-640 (Formerly I-5), Dec. 2017, 2 pages.
Peter J. Arsenault, FAIA, NCARB, LEED AP, "Window Sprinklers as an Alternative to Fire-Rated Glass", Continuing Education, Mar. 2018, 12 pages.
Tyco Fire Protection Products, Datasheet, Model WS Specific Application Window Sprinklers Horizontal and Pendent Vertical Sidewall 5.6K Factor, TFP620, Oct. 2016, 10 pages.
Reliable Automatic Sprinkler Co., Model B Model FM Spray Nozzles, Bulletin 103 Rev. B, Oct. 2012, 2 pages.
Reliable Automatic Sprinkler Co., Model B Model FM Spray Nozzle, Distribution Patterns, Date Unknown, 1 page.
The Viking Corporation, Technical Data, Model C-1 Window Sprinklers, Form No. F_051800, Dec. 20, 2013, 6 pages.
European Patent Office, Extended European Search Report in European Application No. 19901263.4, Aug. 18, 2022, 7 pp.

* cited by examiner

PENDENT VERTICAL SIDEWALL WINDOW SPRINKLERS, SYSTEMS AND METHODS OF FIRE PROTECTION

PRIORITY CLAIM & INCORPORATION BY REFERENCE

This application is continuation application of U.S. patent application Ser. No. 16/757,881, filed Apr. 21, 2020, which is 35 U.S.C. § 371 application of International Application No. PCT/US2019/066361, filed Dec. 13, 2019, which claims the benefit of U.S. Provisional Application No. 62/781,285 filed Dec. 18, 2018, each of which is incorporated by reference in its entirety.

TECHNICAL FIELD

The present invention relates generally to sprinklers and systems for the protection of windows. In particular, the present invention relates to pendent vertical sidewall sprinklers, their fluid distribution and system installation to protect multiple glass panes joined together forming a window arrangement.

BACKGROUND ART

The design and installation of fire protection sprinkler systems is dependent upon several factors including: the area to be protected, the occupants or items to be protected in the area being protected, the manner in which a fire is to be addressed. One particular area of interest is fire protection systems for the use on and protection of windows. Fire protection sprinklers are generally subject to industry accepted fire code requirements and the approval of the "authority having jurisdiction" (AHJ) to ensure compliance with the applicable codes and requirements. For example, one applicable standard is "NFPA 13: Standard for the installation of Sprinkler Systems" (2016) ("NFPA 13") from the National Fire Protection Association (NFPA). NFPA 13 provides minimum requirements for the design and installation of fire protection sprinkler systems based upon the area to be protected, the anticipated hazard and the type of protection performance to be provided.

One manner of satisfying the applicable requirements, is by identification of fire protection sprinklers capable of providing water on the surface of a window in a suitable manner To facilitate the AHJ approval process, fire protection equipment can be "listed," which as defined by NFPA 13, means that the equipment is included in a list by an organization that is acceptable to the AHJ and whose list states that the equipment "meets appropriate designated standards or has been tested and found suitable for a specified purpose." One such listing organization includes, Underwriters Laboratories Inc. ("UL"), which publishes UL Standard for Safety for Automatic Sprinklers for Fire-Protection Service UL 199 (11th ed. 2005, rev. 2008) ("UL 199") and UL Standard 199J: "Outline of Investigation for Fire Testing of Specific Application Sprinklers for Use on Windows" Issue No. 2 (Jul. 17, 2017) to provide various operational testing for fire protection sprinklers. Another listing organization is Underwriters' Laboratories of Canada (ULC) which publishes ULC/ORD-C263,1-99 "Sprinkler-Protected Window Systems" that provides the testing performance requirements to assess performance, under controlled the exposure conditions, of a sprinkler protected window system.

Known sprinkler systems for protection of a window arrangements include sprinklers that are positioned to wet and cool the glass panes of the window arrangement. A window arrangement generally includes glass panes affixed between an upper window frame and a lower window frame. In arrangements having multiple glass panes, the glass panes may be separated from one another by vertical barriers or mullions that extend between the upper and lower window frames. Alternatively, the individual glass panes can abut one another in a butt joint formation. Fire protection sprinklers for the protection of windows can be automatic or non-automatic. Generally, automatic fire protection sprinklers include a solid metal body and some type of deflector to distribute fluid supplied to and discharged from the body in a defined spray distribution pattern. Fluid discharge from an automatic fire protection sprinkler is automatically controlled by operation of a heat-responsive actuator or trigger that maintains a fluid tight seal at the discharge orifice by exertion of pressure on a cap (button or disc) or other sealing assembly. When the temperature surrounding the sprinkler is elevated to a pre-selected value indicative of a fire, the actuator operates thereby permitting ejection and release of the cap by the discharge of the supplied fluid through the unsealed sprinkler. In the case of non-automatic sprinklers used in manual or automatic deluge systems, there is neither heat-responsive actuator or trigger nor is there a sealing assembly. Instead the non-automatic sprinkler is always open to discharge fluid upon fluid delivery from a fluid supply that is controlled and initiated either manually or through an automatic fluid control system.

Fire protection sprinklers can be characterized by: its discharge characteristics, its installation orientation (pendent or upright), and its fluid distribution and coverage. The discharge or flow characteristics from the sprinkler body is defined by the internal geometry of the sprinkler including its internal passageway, inlet and outlet (the orifice). As is known in the art, the K-factor of a sprinkler is defined as $K=Q/P^{1/2}$, where Q represents the flow rate (in gallons/min GPM) of water from the outlet of the internal passage through the sprinkler body and P represents the pressure (in pounds per square inch (psi.)) of water or firefighting fluid fed into the inlet end of the internal passageway through the sprinkler body. The spray pattern or distribution of a firefighting fluid from a sprinkler defines sprinkler performance Several factors can influence the water distribution patterns of a sprinkler including, for example, the shape of the sprinkler frame, the sprinkler orifice size or discharge coefficient (K-factor), the installation orientation and the geometry of the deflector.

The known window sprinklers include a fluid deflecting member for distributing water over the glass panes. The sprinklers are installed and coupled to a fluid supply pipe in a manner that orients the deflector to confront the glass pane below the upper window frame. In at least one of the known systems, the sprinklers are located at a distance of four inches to twelve inches (4-12 in.) from the glass panes. Additionally, the sprinklers are located from the nearest vertical barrier at a distance that can range from a minimum of four inches to a maximum of four feet (⅓ ft. to 4 ft.). Moreover, the known sprinklers are spaced from one another at a sprinkler-to-sprinkler spacing that can extend up to a maximum of eight feet (8 ft.). At the installation spacings, the sprinklers require a minimum supply of fluid flow that ranges from 15-20 gallons per minute (GPM). There remains a need for greater sprinkler-to-sprinkler spacing distances that can improve sprinkler installations by increasing window sprinkler coverage of each sprinkler and/or reduce the number of sprinklers required for a given installation.

DISCLOSURE OF INVENTION

Preferred systems and methods of window fire protection include a preferred pendent vertical sidewall window sprinkler capable of providing water on the surface of a window to limit the transmission of heat from a fire to the glazing material and maintain the integrity of the window. The preferred embodiments of the window sprinkler include a fluid distribution member define a surface geometry to facilitate window fire protection system installations with maximum sprinkler-to-sprinkler spacings larger than those available under known systems. Preferred embodiments of a pendent vertical sidewall sprinkler include a fluid distribution member having a throw channel defined by an arcuate surface about the sprinkler axis to provide for lateral throw of fluid at a distance of up to fifteen feet. Preferred embodiments of a pendent vertical sidewall window sprinkler include a fluid deflection member having a front face for confronting a window to be protected. The fluid deflection member includes an impact surface opposed to the sprinkler outlet and a preferred retention surface that is adjacent and/or contiguous with the impact surface for directing the impact fluid to provide a preferred forward and lateral fluid distribution. Preferred embodiments of the retention surface have one or more radius of curvatures to define a preferred surface profile about the sprinkler axis. Moreover, preferred embodiments of the sprinkler and fluid deflection member include opposition surfaces spaced from the impact surface to define a preferred interior retention surface and lateral throw channel for facilitating the preferred fluid distribution.

Another preferred embodiment of a window sprinkler is embodied as a pendent vertical sidewall window sprinkler having a frame including a body having an inlet, an outlet with an internal passageway extending between the inlet and the outlet along a sprinkler axis. The frame preferably includes a pair of frame arms extending axially from the body about a bisecting plane that includes the sprinkler axis; and a preferred distribution block supported by the frame arms at a fixed distance from the outlet. The preferred distribution block has a front face, a rear face and a first peripheral surface and a second peripheral surface spaced apart from one another about the bisecting plane. The distribution block also preferably includes a first portion having an impact surface opposed to the outlet and disposed perpendicular to the sprinkler axis. A second portion of the distribution block is disposed between the outlet and the first portion and spaced from the impact surface. An interior surface of the preferred distribution block extends between the first and second portions to define a preferred lateral throw channel. The preferred interior surface extends from the first peripheral surface to the second peripheral surface so as to intersect the bisecting plane and define a minimum radial distance from the sprinkler axis. The interior surface is preferably arcuate defining a first radius of curvature in the bisecting plane about a first linear axis in the bisecting plane that is parallel to the sprinkler axis that is greater than the minimum radial distance. The first radius of curvature is preferably constant over the length of the arcuate interior surface from the first peripheral surface to the second peripheral surface.

Preferred systems and methods are provided for the protection of windows include a fire sprinkler with a fluid deflection member that provides for a sprinkler-to-sprinkler spacing that that can range from six to fifteen feet (6-15 ft.), preferably ranging from six to twelve feet (6-12 ft.) and more preferably range from over eight feet to fifteen feet (8+-15 ft.). In one or more preferred system embodiments, the maximum sprinkler-to-sprinkler spacing can range from ten to fifteen feet (10-15 ft.) and yet even more preferably provide for a maximum sprinkler-to-sprinkler spacing of at least twelve feet (12 ft.). A preferred system is provided for protection of a window arrangement having a plurality of glass panes extending vertically between an upper window frame and a lower window frame with each of the glass panes having a face. The preferred system includes a firefighting fluid supply pipe; and a plurality of pendent window sprinklers coupled to the fluid supply pipe and confronting the glass panes below the upper window frame. Each sprinkler preferably includes a frame including a body having an inlet, an outlet with an internal passageway extending between the inlet and the outlet along a sprinkler axis, a fluid distribution member having a plurality of surfaces for distributing firefighting fluid over the face of a glass pane laterally for wetting and cooling the glass pane to address a fire at a maximum sprinkler-to-sprinkler spacing that ranges from over eight feet to fifteen feet (8+ ft-15 ft.).

BRIEF DESCRIPTION OF DRAWINGS

The accompanying drawings, which are incorporated herein and constitute part of this specification, illustrate exemplary embodiments of the invention, and together, with the general description given above and the detailed description given below, serve to explain the features of the invention. It should be understood that the preferred embodiments are some examples of the invention as provided by the appended claims.

MODE(S) FOR CARRYING OUT THE INVENTION

Figure 1:
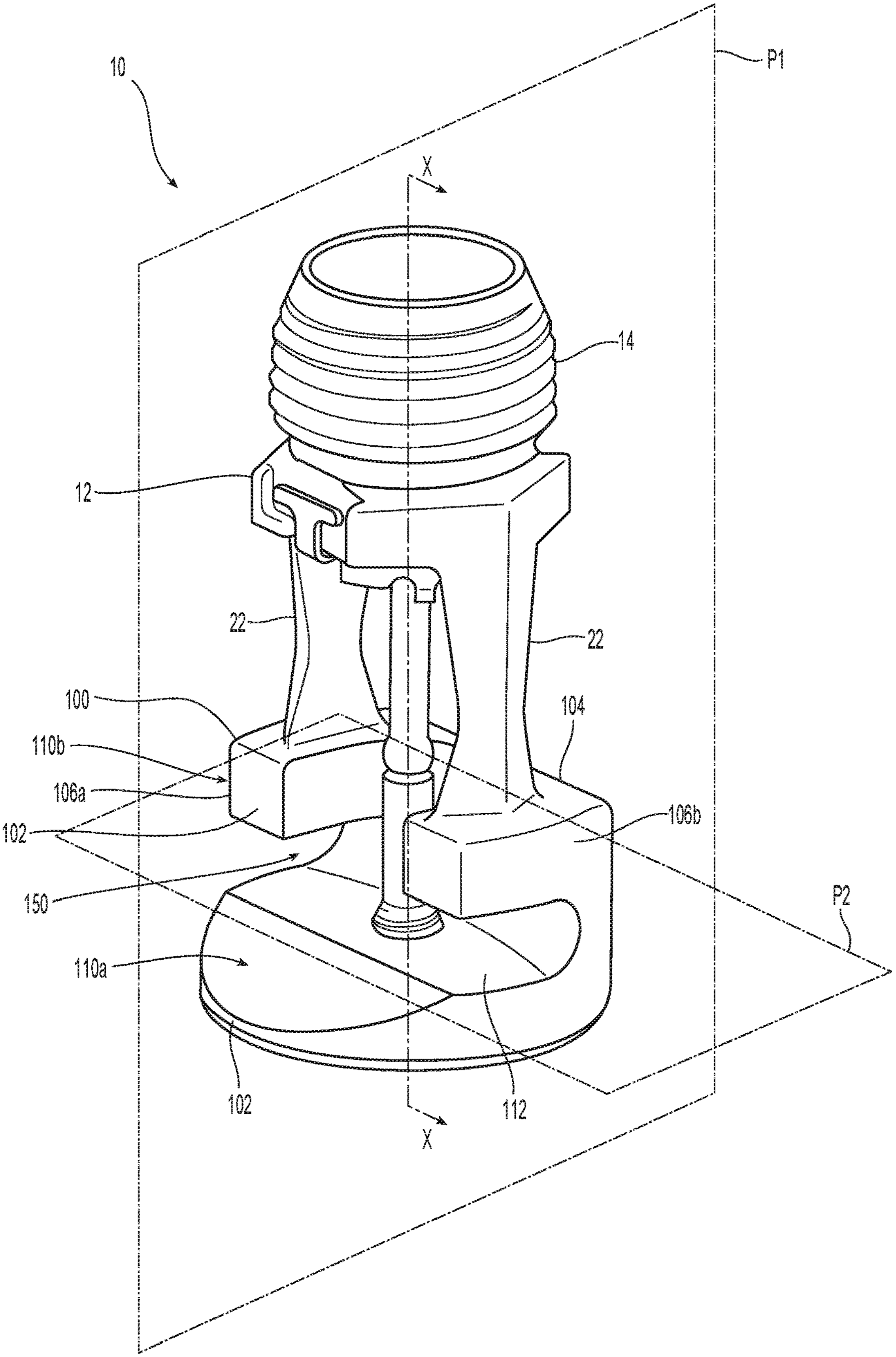
FIG. 1 is a perspective view of a preferred embodiment of a pendent vertical sidewall window sprinkler in an unactuated and sealed configuration.
Figure 1A:
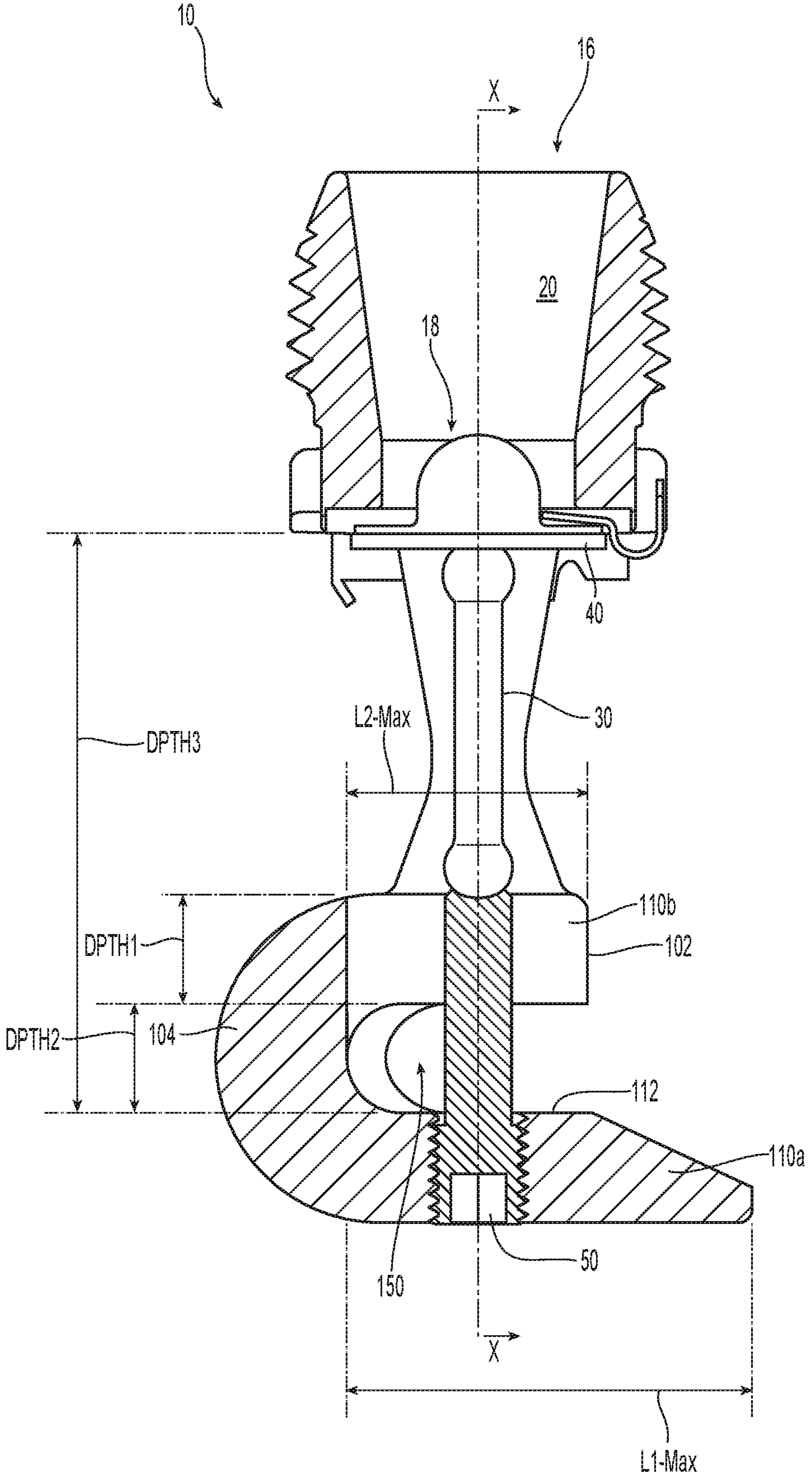
FIG. 1A is a cross-sectional view of the sprinkler of FIG. 1 in an unactuated and sealed configuration.

Shown in FIGS. 1 and 1A is a preferred pendent vertical sidewall window sprinkler 10 that includes a frame 12 having a body 14 with an inlet 16, an outlet 18 and an internal passageway 20 extending between the inlet 16 and the outlet 18 along a sprinkler axis X-X to define the sprinkler orifice. The internal passageway 20 preferably tapers narrowly from the inlet 16 to the outlet 18. The discharge characteristics from the sprinkler body 12 and its outlet orifice are preferably quantified by the industry accepted discharge coefficient or nominal K-factor. The sprinkler body 12 defines a nominal K-factor that is preferably less than K11 GPM/(PSI)$^{1/2}$ and is preferably a K 5.6 GPM/(PSI)$^{1/2}$ (hereinafter K5.6). The outlet 18 defines a preferred outlet diameter DIA of 0.44 inch. A fluid deflection member 100 is axially spaced from the outlet 18 for distribution of a firefighting fluid. Fluid supplied to the sprinkler inlet 16 flows through the internal passageway 20 and is discharged from the outlet 18 to impact the deflection member 100 to wet and cool a window arrangement in a preferred manner as described herein. Preferred embodiments of the sprinkler 10 are configured for installation in a vertical or pendent orientation in which the sprinkler is suspended from a fluid supply pipe with the inlet 16 coupled to the pipe and the deflector aligned axially below the body 14 such that water discharged from the outlet flows in the downward direction to impact the deflection member 100. Accordingly, the frame body 14 is preferably configured for fastening to a pipe fitting using, for example, an appropriate external pipe thread for engagement with a complimentary thread of a pipe fitting. In the preferred embodiment of the frame 12, the external thread is preferably ½-14 NPT thread.

The sprinkler 10 is preferably configured as an automatic sprinkler for installation in an interior sprinkler system for protection of an internal face of a window arrangement. The frame 12 also preferably includes a pair of spaced apart frame arms 22 extending axially from the body 14 to define a frame window in between. The fluid deflection member 100 is preferably located or supported at the ends of the frame arms 22 to axially space the deflection member 100 from the outlet 18 at a preferably fixed distance. The frame arms 22 are preferably equidistantly disposed about a bisecting plane P1 that includes the sprinkler axis X-X and bisects the body 14. As seen in FIG. 1A, a thermally responsive trigger 30 is disposed within the frame window and aligned with the sprinkler axis X-X to support a seal assembly 40 within the outlet 18 to seal the sprinkler 10. In the unactuated and sealed state of the sprinkler, a load member 50 applies a load force that is transferred by the thermally responsive trigger 30 to the seal assembly 40 to maintain the seal assembly within the outlet again incoming fluid supply pressure. In the preferred embodiment shown, the load member 50 is configured as a threaded member engaged with the fluid deflection member 100. Increased torque on the load member 50 increases the load force on the trigger 30 and seal assembly 40 to control fluid discharge from the outlet 18. The thermally responsive trigger 30 is preferably embodied as a thermally responsive frangible glass bulb but can be alternatively embodied as a thermally responsive mechanical or electrically actuated assembly provided the assembly can seat and unseat the seal assembly 30 in respective unactuated and actuated states of the sprinkler. In the presence of a sufficient level of heat, the thermally responsive element 30 operates or actuates to release the sealing assembly 40, unseal the sprinkler 10 and permit the supplied fluid to discharge from the outlet 18 to impact the fluid deflection member 100 for distributing fluid on a window. Alternatively, the sprinkler 10 can also be configured as an open sprinkler for installation in an outdoor deluge sprinkler system for protection of an exterior face of a window arrangement. In an open configuration, the sprinkler has neither a trigger 30 nor a seal assembly 40 disposed in the outlet 18 of the sprinkler. Thus, the sprinklers are open in the unactuated state of the system with fluid delivered to the sprinklers either manually or by an automatic thermally responsive fluid control valve arrangement. Upon the fluid delivery to the open sprinkler 10, the supplied fluid is discharged from the outlet 18 to impact the fluid deflection member 100 for distributing fluid on the exterior face of the window arrangement.

The fluid deflection member 100 is generally symmetric having a preferred arrangement of surfaces for dispersing, distributing and/or directing firefighting fluid in one or more radial directions about the sprinkler axis X-X as described herein. As described herein, the preferred surface geometry of the deflection member 100 facilitates window fire protection system installations with maximum sprinkler-to-sprinkler spacings larger than those available under known systems. The fluid deflection member 100 has a front face 102 for confronting a window over which the firefighting fluid is distributed. The fluid deflection member 100 includes an impact surface 112 opposed to the outlet that is preferably disposed perpendicular to the sprinkler axis to be impacted by fluid discharged from the sprinkler outlet. The deflection member 100 also preferably includes a retention surface 120 that is adjacent and/or contiguous with the impact surface 112 and more preferably out of the plane of the impact surface 112 for directing the impact fluid laterally of the bisecting plane and forward of the sprinkler axis and front face to provide the forward and lateral fluid distribution. Preferred embodiments of the retention surface 120 are arcuate about the sprinkler axis X-X and more preferably defining a radius of curvature about an axis parallel to the sprinkler axis. Alternatively, or additionally, the retention surface is arcuate about a second axis that is disposed perpendicular to the bisecting plane. Moreover, preferred embodiments of the fluid deflection member 100 include opposition surfaces spaced from the impact surface 112 to define a preferred internal lateral throw channel 150 with the preferred retention surface 120 for facilitating the preferred distribution.

The fluid deflection member 100 having two or more of the preferred surfaces can be formed, bent or fabricated from a singular piece of material or alternatively be formed by an arrangement of separate component materials. Accordingly, the fluid deflection member 100 can be fabricated and formed by bending of a metal blank to provide, for example, the impact and retention surfaces 112, 120 and more preferably provide the preferred impact and retention surfaces and lateral throw channel 150. Further in the alternative, the fluid deflection member 100 can be formed by separate components or elements which are joined to provide for interiorly located fluid surfaces and/or channels to provide the fluid distribution described herein.

A preferred embodiment of the fluid deflection member 100 is integrally formed body with the frame 12 and can be formed by casting and appropriate machining As shown in FIGS. 1-3A, the deflection member 100 is preferably embodied as a distribution block 100. The distribution block 100 is substantially cylindrical and centered about the sprinkler axis X-X. With particular reference to FIG. 1, the distribution block 100 defines a front face 102 that is preferably symmetric with respect to the bisecting plane P1, an opposite rear face 104, a first peripheral surface **106*a* and a second peripheral surface 106*b* spaced apart from one another about the bisecting plane P1. Each of the first and second peripheral surfaces 106*a*, 106*b* extend from the rear face 104 to the front face 102. With reference to FIG. 2A, each of the first and second peripheral surface 106*a*, 106*b* preferably have a radius of curvature RAD equal to one another about the sprinkler axis X-X that is equivalent to one another. Moreover, the sum of the radii RAD define a preferred maximum width or diameter (2×RAD) of the distribution block 100. In a preferred embodiment, the deflection member 100 has a preferred maximum width or diameter (2×RAD) of 1.25 inch. As shown, the front and rear surfaces 102, 104 are preferably defined by two or more peripheral surfaces of the distribution block 100 formed about the sprinkler axis X-X. For example, the front face 102** includes an arcuate peripheral surface that extends over the length of the impact surface and two planar peripheral surfaces spaced about the sprinkler axis X-X for confronting a window.

Figure 2:
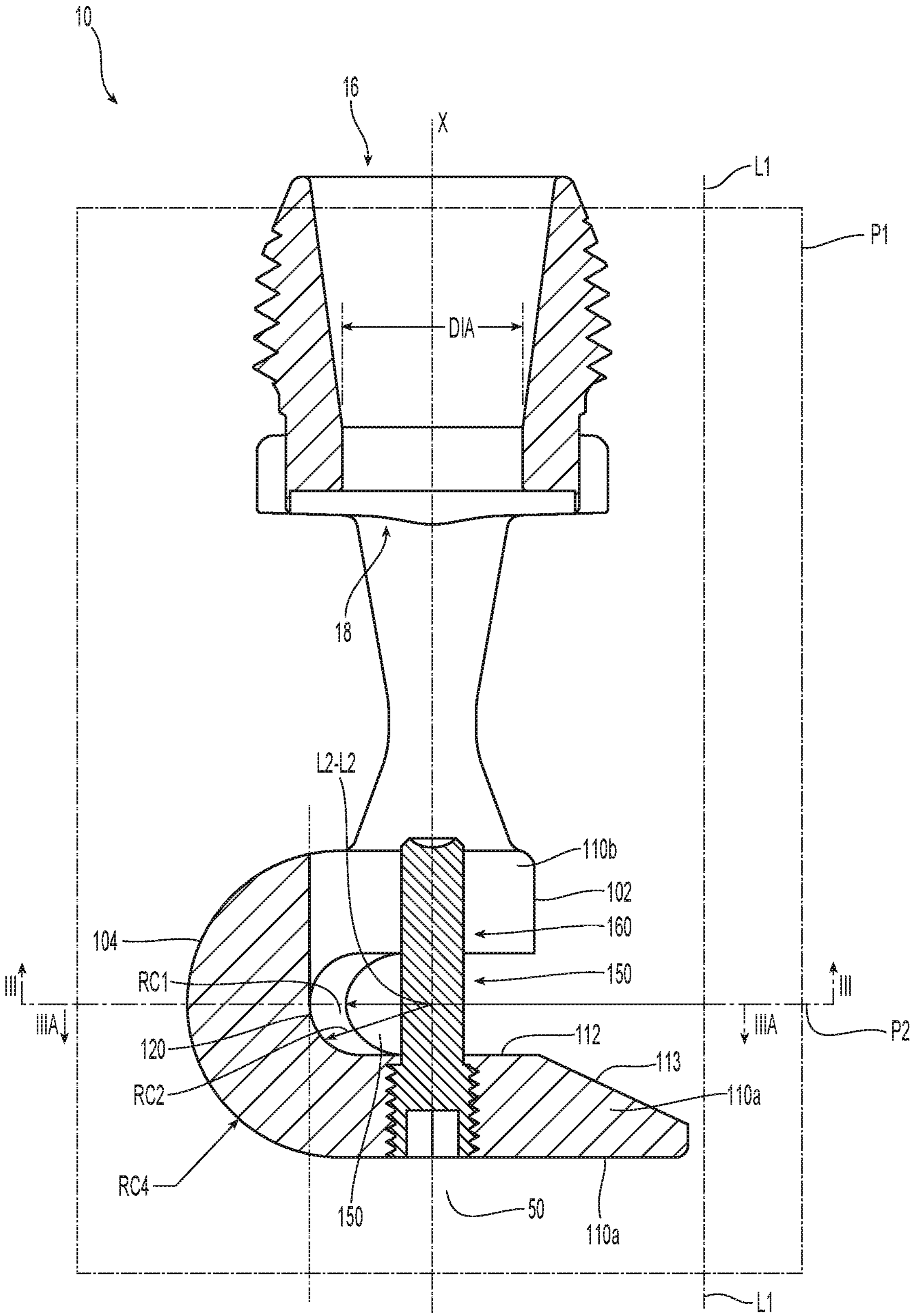
FIG. 2 is a cross-sectional view of the sprinkler of FIG. 1 in an actuated and unsealed configuration.
Figure 2A:
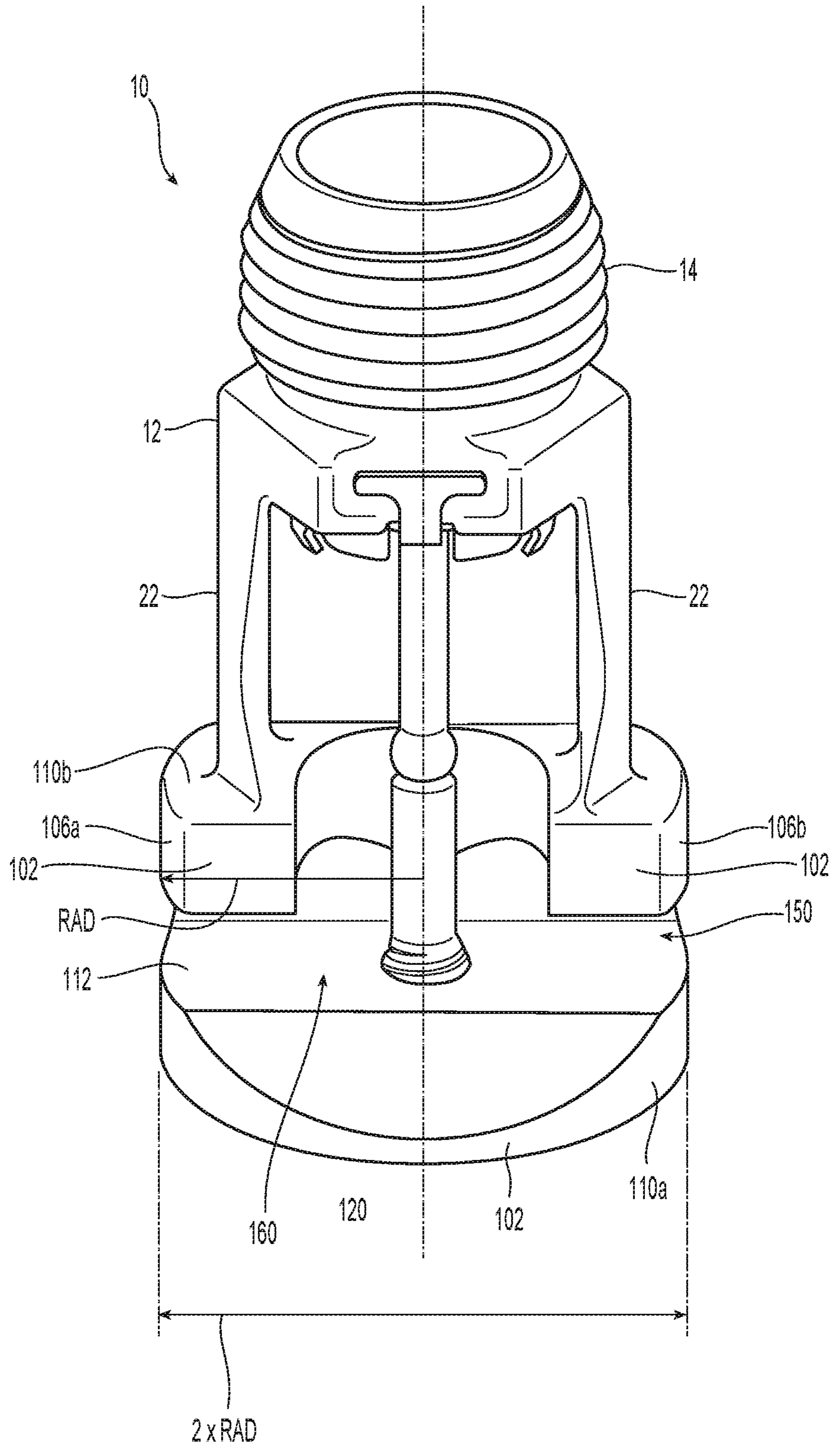
FIG. 2A is another perspective view of the sprinkler of FIG. 1 in an unactuated and sealed configuration.

With reference to FIGS. 1A, 2 and 2A, the distribution block 100 preferably includes a first portion 110*a* defining a preferred deflecting or impact surface 112 opposed to the outlet 18 that is preferably disposed perpendicular to the sprinkler axis X-X. The impact surface 112 is circumscribed about the load member 50, which is coaxially aligned along the sprinkler axis X-X. A second portion 110*b* of the deflector is preferably disposed between the outlet 18 and the first portion 110*a* and preferably axially spaced from the impact surface 112. In the preferred embodiment of the distribution block 100 shown, the retention surface 120 is an interior surface of the block 100 that extends between the first and second portions 110*a*, 110*b* to define a preferred lateral throw channel 150 for throwing the fluid in opposed lateral directions. The retention surface 120 is adjacent and preferably contiguous with the impact surface 112 and extends out of plane with respect to the impact surface 112 to extend toward the second portion 110*b* of the distribution block 100.

Figure 3:
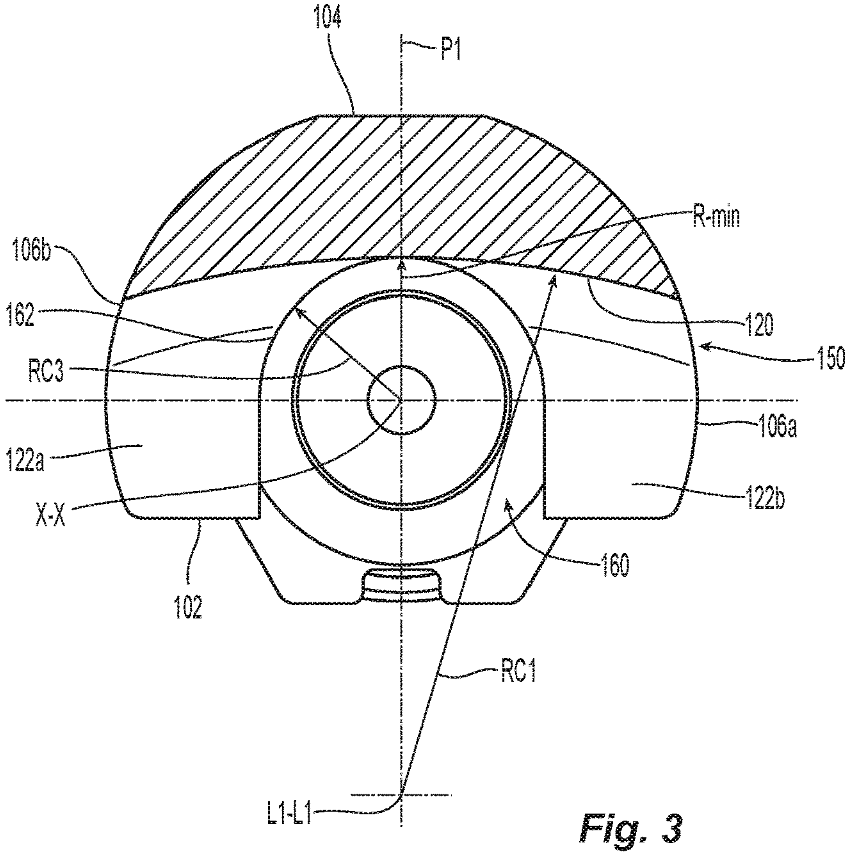
FIG. 3 is a cross-sectional view of the sprinkler of FIG. 1 along line III-III in FIG. 2.
Figure 3A:
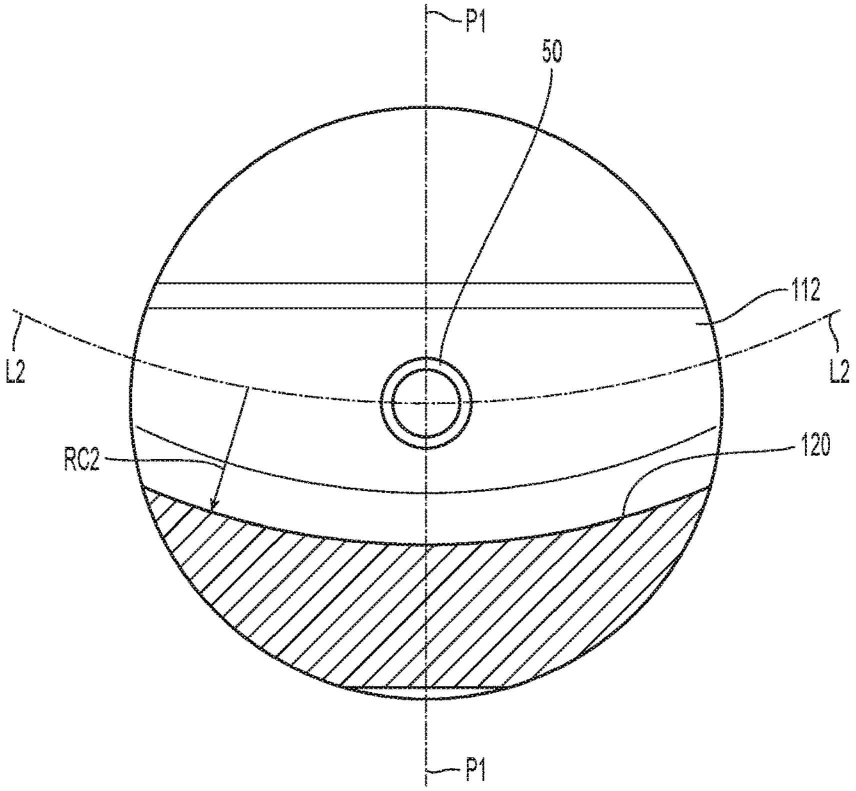
FIG. 3A is a cross-sectional view of the sprinkler of FIG. 1 along line IIIA-IIIA in FIG. 2.

As seen in the cross-sectional view of the throw channel 150 in FIGS. 3 and 3A, the interior retention surface 120 and throw channel 150 preferably extend from the first peripheral surface 106*a* to the diametrically opposed second peripheral surface 106*b* so as to symmetrically intersect the bisecting plane P1 and define a minimum radial distance R-Min from the sprinkler axis X-X. The interior retention surface 120 is preferably arcuate about the sprinkler axis X-X and more preferably defining a first radius of curvature RC1 in the bisecting plane about a first linear axis L1-L1 located in the bisecting plane P1 that is parallel to the sprinkler axis. The first radius of curvature RC1 is greater than the minimum radial distance R-Min. In a preferred embodiment, the first radius of curvature RC1 is two inches inch (2 in.) with minimum radial distance R-Min to the sprinkler axis X-X being about 0.3 inch. Accordingly in a preferred aspect, the retention surface 120 and its radius of curvature RC1 can define a preferred ratio (RC1:R-Min) with its radial distance to the sprinkler axis X-X of 5:1. The first radius of curvature RC1 is preferably constant over the entire arc length of the arcuate interior retention surface 120 from the first peripheral surface 106*a* to the second peripheral surface 106*b*.

Referring to FIG. 2, the interior retention surface 120 extends from the first portion 110*a* to the second portion 110*b* and is preferably symmetrical about a second bisecting plane P2 that is perpendicular to the first bisecting plane P1. The interior retention surface 120 defines a preferred second radius of curvature RC2 with respect to a second linear, preferably curvilinear, axis L2-L2 in the second bisecting plane P2 and perpendicular to the first plane P1. The second radius of curvature RC2 is preferably less than the minimum radial distance R-Min between the axis A-A and the interior surface 120. In a preferred aspect, the retention surface 120 and its preferred second radius of curvature RC2 can define a preferred ratio (R-Min:RC2) with its radial distance to the sprinkler axis X-X of about 2.5:1 and more preferably 2.4:1. The second radius of curvature RC2 is preferably constant from the first portion 110*a* to the second portion 110*b*. Accordingly, the interior retention surface 120 preferably has a constant surface profile over its arc entire length.

The other portions of the distribution block 100 define one or more preferred dimensional relationships with one another and with respect to the arcuate retention surface 120 and the other fluid deflecting surfaces. For example, the fluid deflection member 100 and its maximum width further define a preferred ratio (RC1:2×RAD:) with the first radius of curvature of the retention surface 120 that is about 1.6:1. With reference to FIG. 3A, the second portion 110*b* of the block 100 defines a receiving channel 160 that extends radially inward in a direction from the front face 102 toward the preferred arcuate retention surface 120 intersecting the sprinkler axis X-X. Water discharged from the outlet 18 is received by the channel 160 for introduction of the fluid into the preferred throw channel 150 for radial forward and lateral distribution with respect to the sprinkler axis X-X. The receiving channel 160 is preferably symmetrical about the first bisecting plane P1. The receiving channel 160 has an innermost portion 162 that is arcuate defining a preferred radius of curvature RC3 about the sprinkler axis X-X that is preferably equivalent to the minimum radial distance R-Min between the sprinkler axis X-X and the arcuate surface 120 of the throw channel 150.

As seen in FIG. 1A, the receiving channel 160 also defines a depth DPTH1 in the axial direction of the sprinkler axis X-X that preferably varies with the thickness of the second portion 110*b* of the distribution body 110. The depth of the channel DPTH1 increases over the length of the channel 160 from the front face to the innermost portion. With reference to FIG. 3A, the preferred receiving channel 160 divides the second portion 110*b* of the distribution block 100 to provide a two-piece sidewall of the throw channel 150. Preferably, the second portion 110*b* and the preferred receiving channel 160 provide the opposing surfaces 122*a*, 122*b* to the impact surface 112. In another preferred aspect, the pair of surfaces 122*a*, 122*b* are planar and parallel to the impact surface 112. Referring again to FIG. 1A, the impact surface 112 and the opposing surfaces 122*a*, 122*b* are spaced apart to define the depth DPTH2 of the throw channel 150. In a preferred embodiment, the depth DPTH2 of the throw channel 150 is equal to the maximum depth DPTH1 of the receiving channel 160. Alternatively or additionally, the outlet 18 to impact surface 112 distance or depth DPTH3 defines a preferred ratio with the throw channel depth of DPTH1 (DPTH3:DPTH1) that ranges from 5:1 to 5.5:1 and more preferably ranges from 5.25:1 to 5.5:1. In a preferred embodiment of the distribution block 100, the depth DPTH1 of the receiving channel 160 is about ⅜ inch and more preferably 0.25 inch with the depth DPTH2 of the throw channel 150 being 0.25 inch with the impact surface 112 being located at a preferred depth DPTH3 from the outlet 118 of about 1.4 inch.

The front face 102 of each of the first and second portions 110*a*, 110*b* are located at different distances L with respect to arcuate surface 120. Preferably, the front face 102 of first portion 110*a* defines a maximum distance L1-Max with respect to the arcuate surface 120 that is greater than a maximum distance L2-Max defined by the front face 102 of the second portion 110*b* with respect to the arcuate surface 120. The first portion 110*a* of the distribution body 100 includes a discharge surface 113 angled with respect to the impact surface 112 so as to angle away from the second portion 110*b*. In particular, the discharge surface 113 angles away from the outlet 18 to define a preferred angle of about twenty to thirty degrees (20°-30°) and is preferably twenty-five degrees (25°) with respect to the impact surface 112. In another preferred aspect of the distribution block 100, the rear face 104 is curved extending from the first portion to the second portion, the rear face 104 defining a radius of curvature RC4 with respect to a second linear axis perpendicular to the first bisecting plane. Preferably, the radius of curvature RC4 of the rear face 104 is preferably constant over the length of the rear face from the first peripheral surface 106*a* to the second peripheral surface 106*b*.

The preferred fluid deflecting surfaces can also define preferred relationships with the sprinkler frame 12 and body 14. For example, the outlet 18 of the frame body 14 and its diameter can define a preferred ratio (RC1:DIA) with the first radius of curvature RC1 of the retention surface 120 that is 5:1. In another preferred aspect, the diameter and the preferred second radius of curvature of the retention surface 120 define a preferred ratio (DIA:RC2) of about 3.5:1.

Figure 4A:
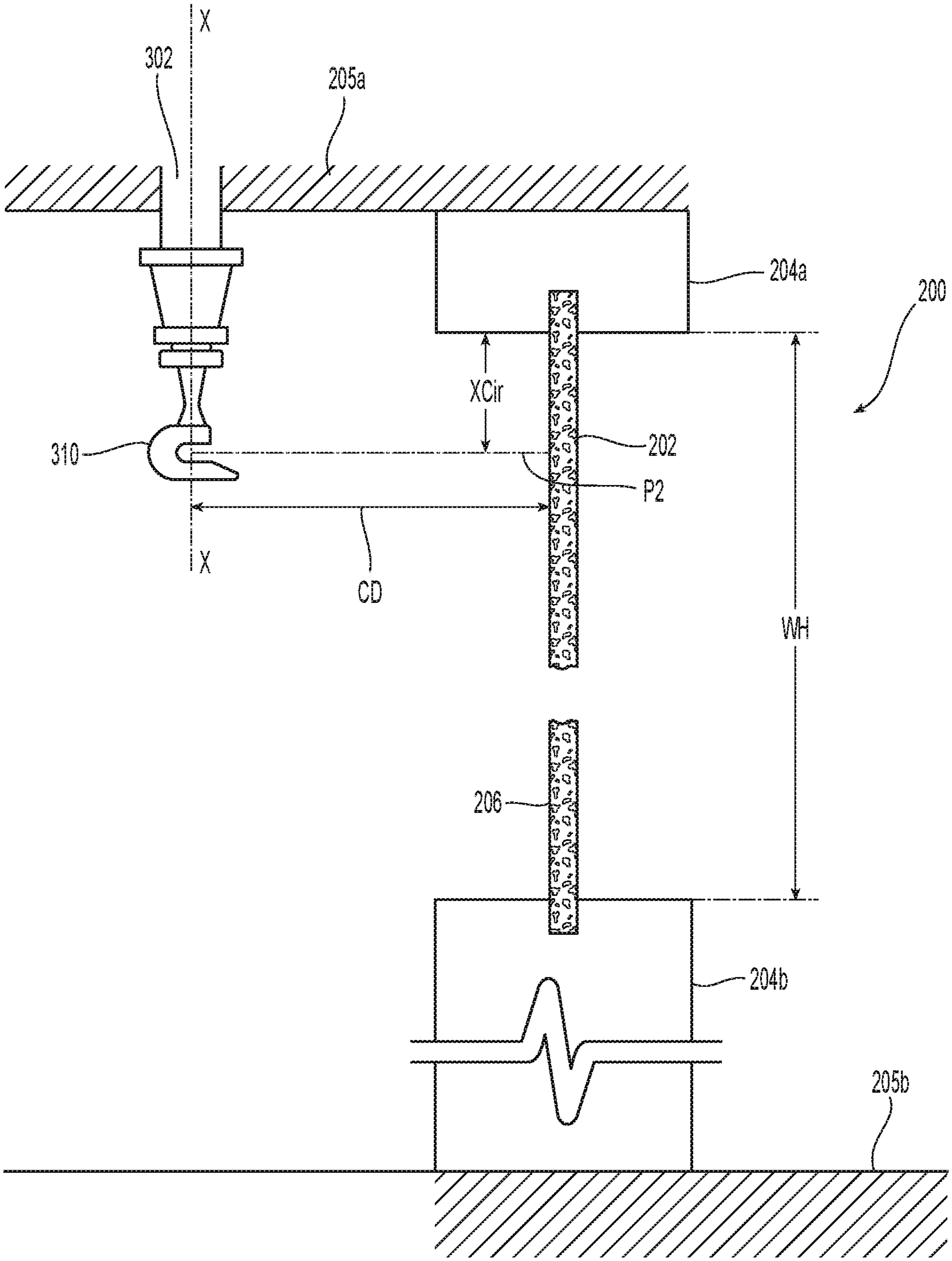
FIGS. 4A-4B are side and elevation schematic views of a preferred window fire protection system using the sprinkler of FIG. 1.
Figure 4B:
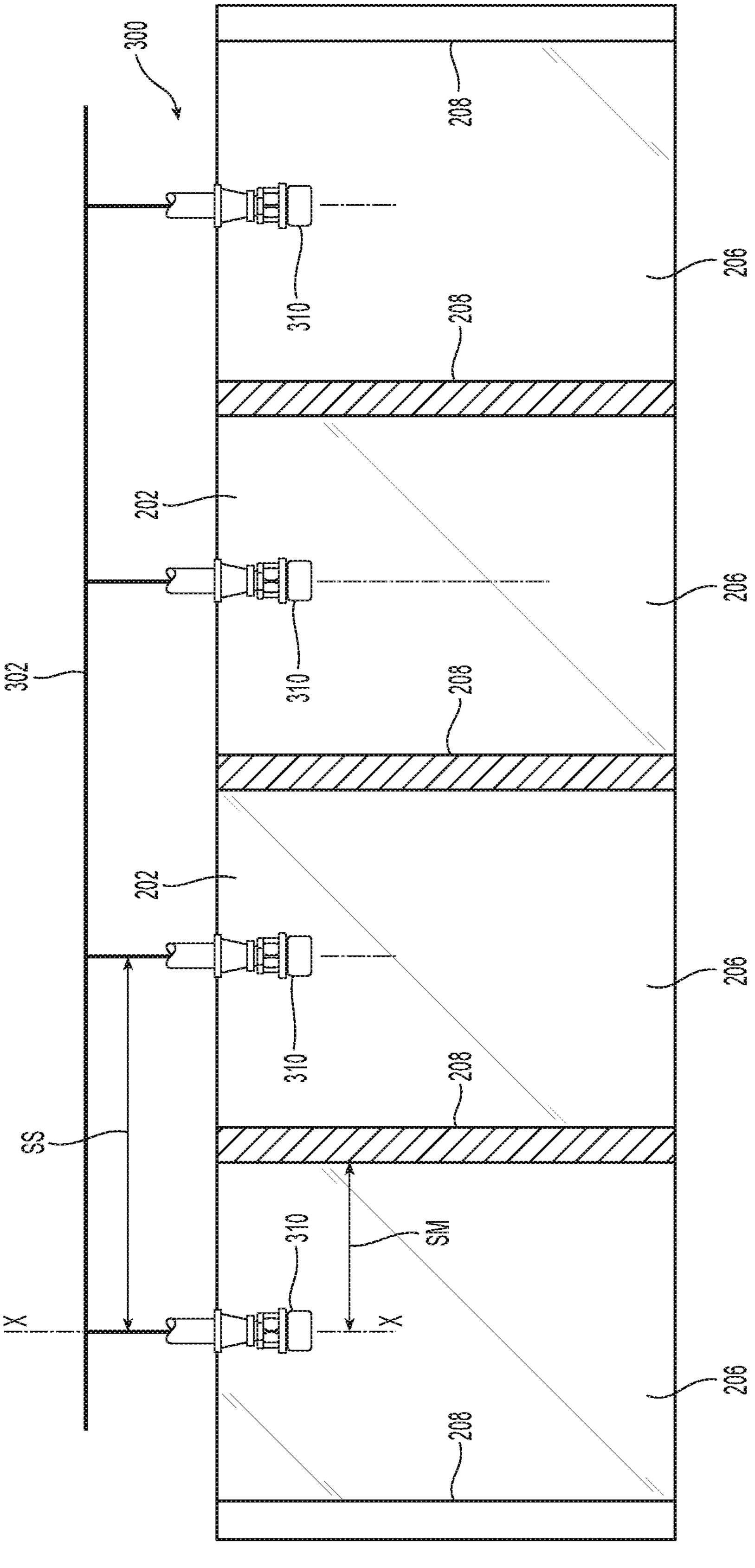

Preferred embodiments of the window sprinkler can be installed in an automatic sprinkler system for protection of a window arrangement located along the exterior of a building or within an interior room of the building. As seen in FIGS. 4A and 4B, an illustrative window arrangement 200 includes a plurality of glass panes 202*a*, 202*b*, 202*c*, 202*d* (202 collectively). The glass panes 202 are preferably constructed as a non-operable glass type with a heat-strengthened and tempered treatment. The glass pane 202 has a preferred ¼ inch thickness with a glazing that is either single-glazed/single pane, double-glazed/double pane or insulated. Each of the window panes 202 extend vertically between an upper window frame 204*a* and a lower window frame 204*b* spaced apart from one another to define a maximum window height WH of up to a preferred thirteen feet (13 ft.). The upper frame 204*a* can be anchored to an overhead building structure 205*a*, such as for example, a ceiling, which can be a recessed ceiling, or overhang. The lower frame 204*b* is anchored to a lower building structure 205*b* such as, for example, a floor or a wall rising from the floor 205*b*. In the elevation view shown in FIG. 4B, each of the glass panes 202 present a face 206. The glass panes 202 are shown separated from one another by vertical barriers or mullions 208 extending between the upper and lower window frames 204*a*, 204*b*. Alternatively, the glass panes 202 can abut one another with a butt joint formed in between the glass panes 202.

A preferred automatic window fire protection system 300 includes a firefighting fluid supply pipe or branch line 302 disposed in the overhead ceiling 205*a* or structure above the window arrangement 200. A group of preferred pendent window sprinklers 310 is coupled to the fluid supply pipe 302 in a manner that orients the sprinklers 310 to confront the glass panes 202 below the upper window frame 204*a*. As seen in FIG. 4A, the sprinklers 310 are installed with axis at a preferred confronting distance CD from the glass pane 202 that preferably ranges from four inches to twelve inches (4-12 in.). Moreover the sprinklers 310 are preferably located vertically below the upper frame 204*a* to define a clearance distance XClr that preferably ranges from two to four inches (2 in.-4) in between the upper frame 204*a* and the second bisecting plane P2 of the preferred fluid deflection member 100 and its throw channel As seen in FIG. 4B, the sprinklers 310 are preferably located horizontally with their axes spaced from the nearest baffle or vertical mullions 208 at a preferred sprinkler-to-mullion distance SM that ranges from a minimum of four inches to a maximum of seven feet (⅓ ft. to 7 ft.). More preferably, the sprinklers 310 are horizontally located to define a sprinkler-to-sprinkler spacing SS from one another as seen in FIG. 4B and in an even more preferred aspect, the sprinklers 310 are horizontally centered with respect to each glass pane 202. The preferred sprinklers 310 include a fluid deflection member having surfaces for distributing firefighting fluid laterally over the face of a glass pane laterally to define a preferred maximum sprinkler-to-sprinkler spacing SS in the presence of the vertical barriers 208. The maximum sprinkler-to-sprinkler spacing SS can range from six feet to 15 feet (6-15 ft.) preferably ranging from six feet to twelve feet (6-12 ft.) and more preferably ranging from over eight feet to fifteen feet (8+-15 ft.).

In window arrangements without vertical barriers or mullions, the sprinklers 310 can be spaced at similar distances. Thus, for example, the sprinklers 310 can be spaced in window arrangements in which the windows are joined by butt joints (not shown) using an appropriate sealant such as, for example, a silicone sealant. For such a window arrangement, the preferred maximum sprinkler-to-sprinkler spacing SS ranges from six feet to twelve feet (6-12 ft.) and more preferably ranging from over eight feet to fifteen feet (8+-15 ft.) with a minimum sprinkler-to-sprinkler spacing SS of six feet (6 ft.).

Effective fire firefighting fluid distribution at the preferred maximum sprinkler-to-sprinkler spacing SS that was not previously available expands installation and system capabilities by providing greater window coverage with fewer sprinklers when compared to previously known window sprinklers and systems. For preferred embodiments, the preferred window sprinkler and systems provide a sprinkler-to-sprinkler spacing SS that can range from six to twelve feet (6-12 ft.), preferably range eight feet to twelve feet (8-12 ft.) and more preferably range from over eight feet to fifteen feet (8+-15 ft.). In one or more preferred system embodiments, the maximum sprinkler-to-sprinkler spacing SS can range from ten to fifteen feet (10-15 ft.) and yet even more preferably provide for a maximum sprinkler-to-sprinkler spacing SS of at least twelve feet (12 ft.).

The system 300 is preferably hydraulically configured to supply at least a minimum flow of firefighting fluid, i.e., water, to each window sprinkler 310 depending upon the sprinkler-to-sprinkler spacing SS. Preferably, each window sprinkler 310 is provided with a minimum flow of fifteen gallons per minute (15 GPM) when the sprinklers 310 are at the preferred maximum sprinkler-to-sprinkler spacing SS. The flow of each sprinkler 310 can be reduced with a reduction in the sprinkler-to-sprinkler spacing SS. For example, for a sprinkler-to-sprinkler spacing of less than six feet, the minimum fluid flow provided for each sprinkler can be lowered to 10 GPM or less.

Figure 5A:
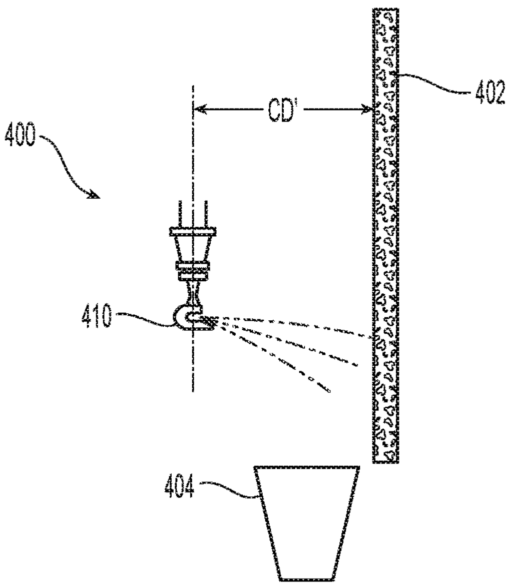
FIGS. 5A-5B are side and elevation schematic views of a preferred fluid distribution set-up testing the sprinkler of FIG. 1.
Figure 5B:
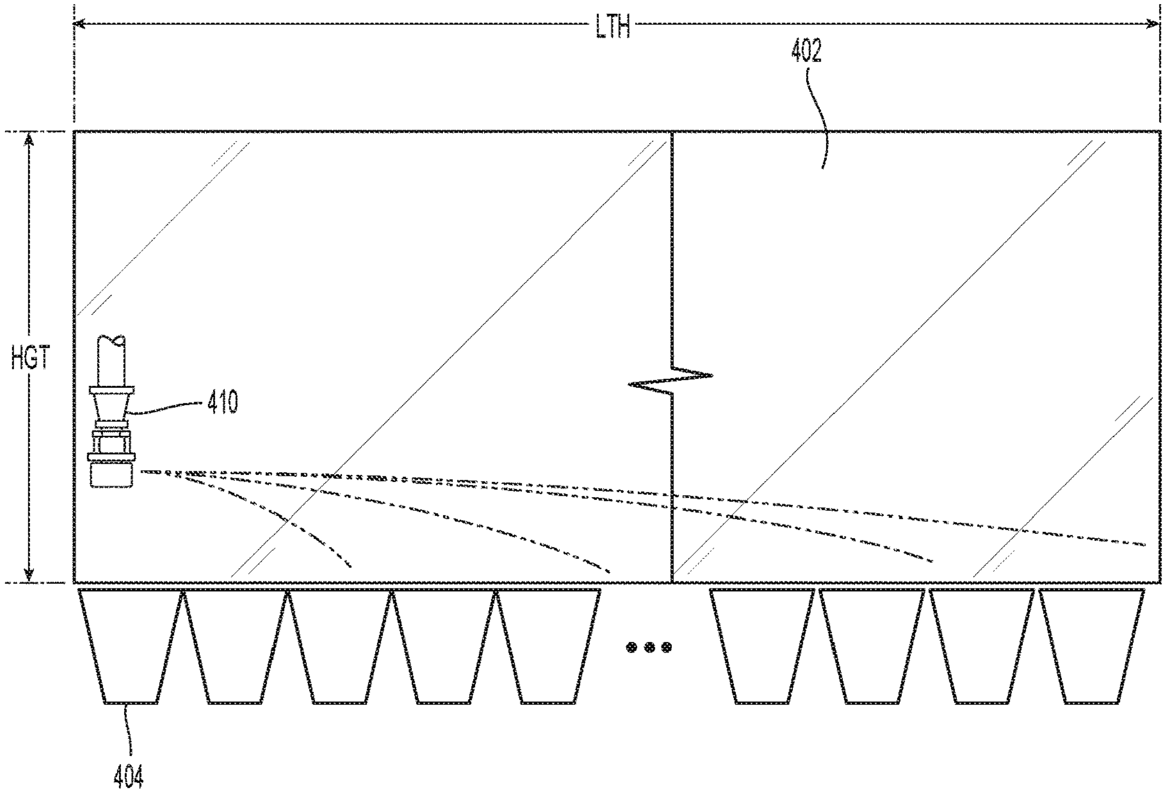

The preferred sprinkler-to-sprinkler SS in the system 300 is based at least in part upon the ability of the sprinklers 310 in the system 300 to laterally throw the firefighting fluid fifteen feet (15 ft.). A preferred fluid distribution test can be carried out to test and evaluate a sprinkler for use in the preferred window fire protection system 300. Shown respectively in FIGS. 5A and 5B are side and elevation schematic views of a preferred fluid distribution test set-up 400 for evaluating a window sprinkler. The test set-up 400 includes a simulated window arrangement 402 preferably constructed from ⅜ inch polycast acrylic having a height HGT of four feet and a length LTH of twenty-four feet (4 ft.×24 ft.). There are no vertical barriers or mullions in the window arrangement 402. Disposed below the window arrangement 402 are a single row array of twenty (20) collection buckets 404 to capture water flowing down the window arrangement 402. Each collection bucket 404 measures one cubic foot (1 cu. ft.) in volume (12 in.×12 in.×12 in.) with a baffle (not shown) disposed on top of the collection bucket to provide for an opening proximate the window to facilitate fluid collection. Accordingly, the array defines a 1 ft.×20 ft. (20 sq. ft.) collection area). A test sprinkler 410 in an open or unsealed state is located so as to confront the window arrangement 402 at a confronting distance CD' of four inches (4 in.) and one foot directly above the first collection bucket 404*a*.

In the preferred fluid distribution test, water was supplied to the open test sprinkler 410 at a preferred flow rate and discharged for a preferred test duration. Water is collected in the collection buckets 404 over the test duration and the collection volume determined. Accordingly, the distribution density, i.e., volume per area, is determined at each foot from the sprinkler. Thus, the lateral throw distance and a density at each foot from the sprinkler can be determined for the test sprinkler 410.

A preferred embodiment of the pendent window sprinkler 10 was installed as the test sprinkler 410. In a first fluid distribution test water was supplied to the test sprinkler 410 and discharged at a flow rate of fifteen gallons per minute (15 GPM) for three minutes (3 min.). The test sprinkler 410 provided for a fluid discharge on the test window arrangement 402 and collection in the bucket array 404 to define a lateral throw from the sprinkler 410 of fluid up to 13 ft. The lateral throw defined an average fluid distribution density of about 0.1 GPM/sq. ft. over a lateral distance 6-12 ft from the sprinkler. In another fluid distribution test, water was again discharged from the test sprinkler 410 at a rate of 15 GPM for thirty minutes (30 min.) to define a lateral throw of 13 ft. and an average fluid distribution density of about 0.09 GPM/sq. ft. over a lateral distance 6-12 ft from the sprinkler.

In another fluid distribution test, water was discharged from the test sprinkler 410 at a rate of 20 GPM for three minutes (3 min.) to define a lateral throw of 15 ft. and an average fluid distribution density of 0.1 GPM/sq. ft. over a lateral distance 6-12 ft from the sprinkler. In another fluid distribution test, water was again discharged from the test sprinkler 410 at a rate of 20 GPM for thirty minutes (30 min.) to define a lateral throw of 17 ft. and an average fluid distribution density of about 0.07 GPM/sq. ft. over a lateral distance 6-16 ft. from the sprinkler.

Given the preferred fluid distribution performance of the preferred window sprinkler 10, preferred methods of fire protection of a window arrangements and identification of window sprinklers capable of such performance are provided. The preferred methods can include obtaining sprinklers for protection of the window arrangement with each window sprinkler having a deflector for distributing fluid over the window arrangement and providing the window sprinklers for installation in a pendent orientation with each deflector oriented to confront a glass pane and discharge fluid toward the glass pane and laterally to define a sprinkler-to-sprinkler spacing that can range from eight to twelve feet (8-12 ft.) and preferably range from over eight feet to fifteen feet (8+-15 ft.). More preferably, the preferred methods of protection provide that the maximum sprinkler-to-sprinkler spacing range from ten to fifteen feet (10-15 ft.) and yet even more preferably provide for a maximum sprinkler-to-sprinkler spacing of at least twelve feet (12 ft.). Obtaining a preferred sprinkler can include any one of manufacturing or acquiring the preferred sprinklers; and providing such sprinklers can further include any one of selling, specifying, testing or supplying the preferred sprinklers for installation in a preferred manner as described herein.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A window sprinkler system including a window arrangement including a plurality of glass panes in a single or double pane configuration, the plurality of glass panes extending vertically between an upper window frame and a lower window frame, the plurality of glass panes having a face, a thickness greater than one-fourth inches, and a maximum height of thirteen feet, the system comprising:

a firefighting fluid supply pipe; and a plurality of automatic pendent window sprinklers coupled to the fluid supply pipe and confronting the glass panes below the upper window frame, each sprinkler having a nominal K-factor of 5.6 and including:

a frame including a body having an inlet, an outlet with an internal passageway extending between the inlet and the outlet along a sprinkler axis; and a fluid deflection member axially spaced from the outlet, the fluid deflection member including:

a planar impact surface opposed to the outlet, disposed perpendicular about the sprinkler axis to be impacted by firefighting fluid discharged from the sprinkler outlet, extended to a perimeter of the fluid deflection member; and a retention surface having a first portion contiguous with and extending out of a plane of the impact surface, wherein the impact surface and the retention surface are configured to provide with respect to the sprinkler axis forward and lateral distribution of the firefighting fluid, flowing from the outlet at fifteen gallons per minute, over the face of a glass pane laterally for wetting and cooling the glass pane to address a fire with each of the plurality of automatic pendent window sprinklers at a spacing of twelve feet.

2. The system of claim 1, wherein each sprinkler further includes:

a thermally responsive trigger assembly disposed between the outlet and the planar impact surface.

3. The system of claim 2, wherein the thermally responsive trigger assembly is a frangible glass bulb.

4. A window sprinkler system for protection of a window arrangement including a plurality of glass panes in a single or double pane configuration, the plurality of glass panes extending vertically between an upper window frame and a lower window frame, the plurality of glass panes having a face, a thickness greater than one-fourth inches, and a maximum height of thirteen feet, the system comprising:

a firefighting fluid supply pipe; and a plurality of automatic pendent window sprinklers coupled to the fluid supply pipe and confronting the glass panes below the upper window frame, each sprinkler having a nominal K-factor of 5.6 and including:

a frame including a body having an inlet, an outlet with an internal passageway extending between the inlet and the outlet along a sprinkler axis; and a fluid deflection member axially spaced from the outlet having a plurality of surfaces for distributing firefighting fluid over the face of a glass pane laterally for wetting and cooling the glass pane to address a fire at a maximum sprinkler-to-sprinkler spacing that ranges from over eight feet to fifteen feet, the fluid deflection member including:

a planar impact surface opposed to the outlet, disposed perpendicular about the sprinkler axis to be impacted by firefighting fluid discharged from the sprinkler outlet, extended to a perimeter of the fluid deflection member; and a retention surface having a first portion contiguous with and extending out of a plane of the impact surface, wherein the retention surface further has a second portion contiguous with the first portion, the second portion extending toward the outlet and the sprinkler axis, or wherein the planar impact surface includes an edge contiguous with the first portion of the retention surface, the edge having a center aligned with a bisecting plane extending through the sprinkler axis, a first side at the perimeter of the fluid deflection member, and a second side at the perimeter of the fluid deflection member, and wherein the center, the first side, and the second side are disposed about a curve defined by a radius of curvature, wherein the impact surface and the retention surface are configured to provide with respect to the sprinkler axis forward and lateral distribution of the firefighting fluid, and wherein the fluid deflection member is symmetric about a bisecting plane that includes the sprinkler axis, the fluid deflection member including a front face to confront the glass panes and an opposite rear face, the rear face extending in a direction from the impact surface toward the outlet with a portion extending away from the sprinkler axis and another portion extending toward the sprinkler axis.

5. The system of claim 4, wherein the fluid deflection member includes an opposition surface spaced from the impact surface; and wherein the retention surface extends between the impact surface and opposition surface.

6. The system of claim 4, wherein the fluid deflection member includes a first peripheral surface and a second peripheral surface, the retention surface extending from the first peripheral surface to the second peripheral surface parallel to a linear axis that extends perpendicular to the bisecting plane.

7. The system of claim 4, wherein the fluid deflection member includes a first peripheral surface and a second peripheral surface, each peripheral surface including an arcuate surface located between the front face and the rear face.

8. The system of claim 4, wherein a maximum sprinkler-to-sprinkler spacing is twelve feet.

9. The system of claim 4, wherein, the glass panes are separated from one another by vertical barriers extending between the upper and lower window frames and each sprinkler axis and closest vertical barriers are laterally spaced apart from one another at spacing that ranges from four inches to seven feet.

10. The system of claim 4, wherein each sprinkler is provided with a minimum supply of fluid flow of fifteen gallons per minute.

11. The system of claim 4, wherein the planar impact surface includes an edge contiguous with the first portion of the retention surface, the edge having a center aligned with the bisecting plane extending through the sprinkler axis, a first side at the perimeter of the fluid deflection member, and a second side at the perimeter of the fluid deflection member, and wherein the center, the first side, and the second side are disposed on a curve defined by the radius of curvature.

12. The system of claim 4, wherein the center, the first side, and the second side are disposed on the curve defined by the radius of curvature.

13. A window sprinkler system for protection of a window arrangement including a plurality of glass panes in a single or double pane configuration, the plurality of glass panes extending vertically between an upper window frame and a lower window frame, the plurality of glass panes having a face, a thickness greater than one-fourth inches, and a maximum height of thirteen feet, the system comprising:

a firefighting fluid supply pipe; and a plurality of automatic pendent window sprinklers coupled to the fluid supply pipe and confronting the glass panes below the upper window frame, each sprinkler having a nominal K-factor of 5.6 and including:

a frame including a body having an inlet, an outlet with an internal passageway extending between the inlet and the outlet along a sprinkler axis; and a fluid deflection member axially spaced from the outlet having a plurality of surfaces for distributing firefighting fluid over the face of a glass pane laterally for wetting and cooling the glass pane to address a fire at a maximum sprinkler-to-sprinkler spacing that ranges from over eight feet to fifteen feet (8+ft-15 ft.), the fluid deflection member including:

a planar impact surface opposed to the outlet, disposed perpendicular about the sprinkler axis to be impacted by firefighting fluid discharged from the sprinkler outlet, extended to a perimeter of the fluid deflection member; and a retention surface having a first portion contiguous with and extending out of a plane of the impact surface, wherein the retention surface further has a second portion contiguous with the first portion, the second portion extending toward the outlet and the sprinkler axis, or wherein the planar impact surface includes an edge contiguous with the first portion of the retention surface, the edge having a center aligned with a bisecting plane extending through the sprinkler axis, a first side at the perimeter of the fluid deflection member, and a second side at the perimeter of the fluid deflection member, and wherein the center, the first side, and the second side are disposed about a curve define by a radius of curvature, wherein the impact surface and the retention surface are configured to provide with respect to the sprinkler axis forward and lateral distribution of the firefighting fluid, and wherein the first portion of the retention surface includes a center segment aligned with a bisecting plane, a first side segment, and a second side segment opposite the first side segment.

14. The system of claim 13, wherein the center segment is contiguous to the first side segment and the second side segment.

15. A pendent vertical sidewall window sprinkler comprising:

a frame including a body having an inlet, an outlet with an internal passageway extending between the inlet and the outlet along a sprinkler linear axis; and a fluid deflection member located at a fixed distance from the outlet for confronting a window, the fluid deflection member being symmetric about a bisecting plane that includes the sprinkler axis, the fluid deflection member including:

a planar impact surface opposed to the outlet, disposed perpendicular to the sprinkler axis, and extended to a perimeter of the fluid deflection member to be impacted by fluid discharged from the outlet; and a retention surface having a first portion contiguous with and extending out of the plane of the impact surface, wherein the retention surface further has a second portion contiguous with the first portion, the second portion extending toward the outlet and the sprinkler axis, or wherein the planar impact surface includes an edge contiguous with the first portion of the retention surface, the edge having a center aligned with the bisecting plane extending through the sprinkler axis, a first side at the perimeter of the fluid deflection member, and a second side at the perimeter of the fluid deflection member, and wherein the center, the first side, and the second side are disposed about a curve defined by a radius of curvature, and wherein the first portion of the retention surface includes a center segment aligned with the bisecting plane, a first side segment, and a second side segment opposite the first side segment.

16. The sprinkler of claim 15, wherein the sprinkler axis is a first linear axis and the retention surface extends laterally parallel to a second linear axis disposed in a second plane axially disposed between the impact surface and the outlet and oriented perpendicular to the bisecting plane, the retention surface defining a profile having a first radius with respect to the second linear axis, the first radius being in the second plane, the retention surface defining at least a second radius with respect to the second linear axis, the at least second radius being out of the second plane between the second plane and the outlet, the at least second radius being no greater than the first radius.

17. The sprinkler of claim 16, wherein the at least second radius is less than the first radius.

18. The sprinkler of claim 16, wherein the second linear axis is a curvilinear axis.

19. The sprinkler of claim 16, wherein the at least second radius is equal to the first radius.

20. The sprinkler of claim 19, wherein the first and at least second radius define a constant radius of curvature over the profile of the retention surface.

21. The sprinkler of claim 15, wherein the fluid deflection member including a front face and an opposite rear face, the rear face extending in a direction from the impact surface toward the outlet with a portion extending away from the sprinkler axis and another portion extending toward the sprinkler axis.

22. The sprinkler of claim 15, wherein the fluid deflection member includes a first peripheral surface and a second peripheral surface, the retention surface extending from the first peripheral surface to the second peripheral surface parallel to a linear axis that extends perpendicular to the bisecting plane.

23. The sprinkler of claim 15, wherein the fluid deflection member includes a front face and an opposite rear face, a first peripheral surface and a second peripheral surface, each of the first peripheral surface and a second peripheral surface located between the rear face to the front face, each peripheral surface including an arcuate surface defining a radius of curvature equal to one another about the sprinkler axis.

24. The sprinkler of claim 23, wherein the retention surface extends from the first peripheral surface to the second peripheral surface parallel to a linear axis that is perpendicular to the bisecting plane.

25. The sprinkler of claim 15, wherein the fluid deflection member includes an opposition surface opposite the impact surface, the opposition surface being contiguous with the retention surface.

26. The sprinkler of claim 25, wherein the retention surface extends between the impact surface and opposition surface.

27. The sprinkler of claim 15, wherein the retention surface further has the second portion contiguous with the first portion, the second portion extending toward the outlet and the sprinkler axis, and wherein the planar impact surface includes the edge contiguous with the first portion of the retention surface, the edge having the center aligned with the bisecting plane extending through the sprinkler axis, the first side at the perimeter of the fluid deflection member, and the second side at the perimeter of the fluid deflection member, and wherein the center, the first side, and the second side are disposed on the curve defined by the radius of curvature.

28. The sprinkler of claim 15, wherein the center, the first side, and the second side are disposed on the curve defined by the radius of curvature.

29. The sprinkler of claim 15, wherein the center segment is contiguous to the first side segment the second side segment.

* * * * *